Patented July 6, 1954

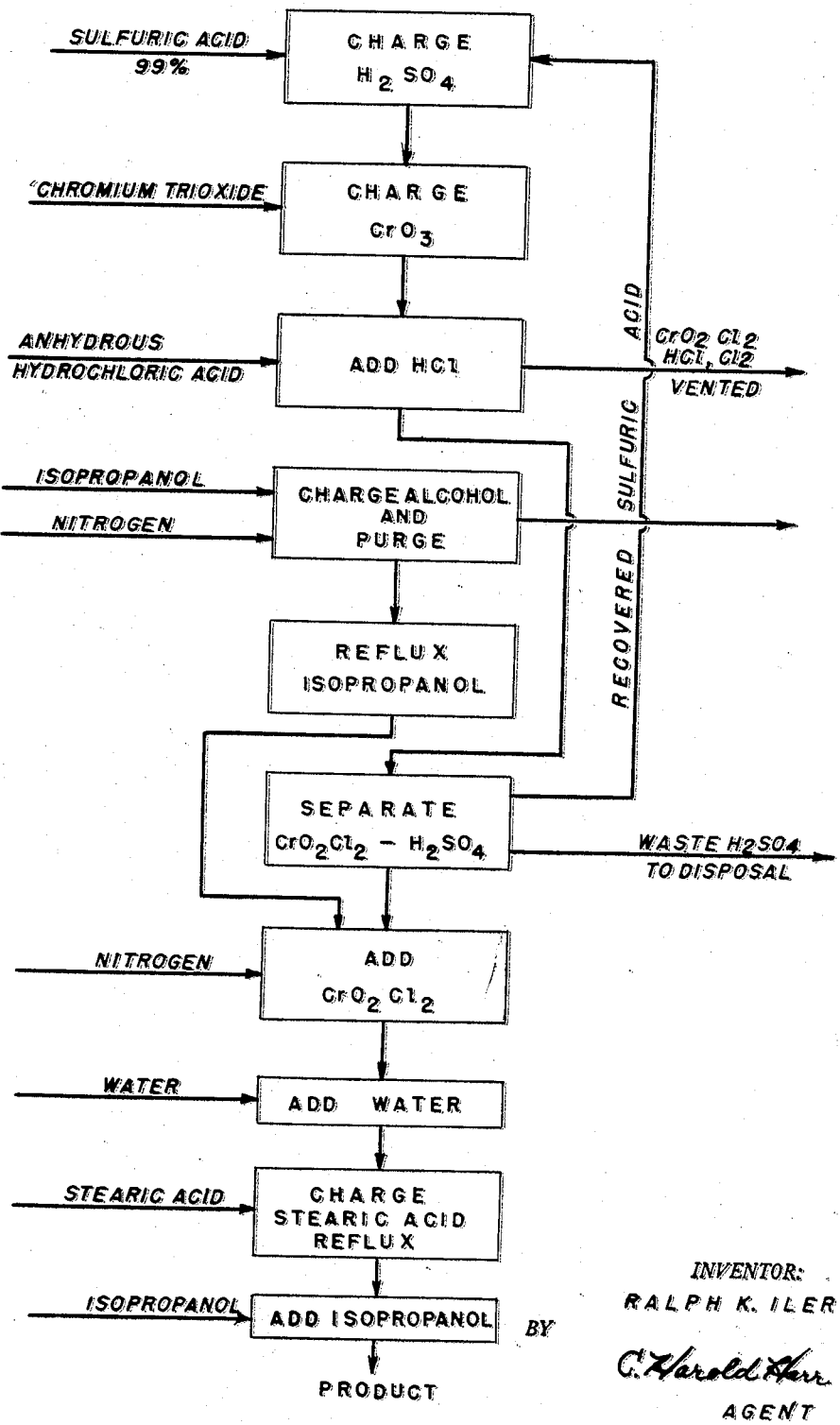

2,683,156

UNITED STATES PATENT OFFICE 2,683,156

PROCESS FOR THE PRODUCTION OF WERNER TYPE CHROMIUM COMPLEXES

Ralph K. Iler, Wilmington, Del., assignor to E. I. du Pont de Nemours and Company, Wilmington, Del., a corporation of Delaware Application June 18, 1951, Serial No. 232,142

6 Claims. (Cl. 260—438)

This invention relates to the manufacture of chromium compounds. More particularly, it is directed to processes comprising the steps of mixing chromium trioxide, hydrogen chloride and sulfuric acid, the sulfuric acid having a strength of at least 68 per cent and being present in an amount sufficient to maintain the system in an anhydrous state, whereby anhydrous chromyl chloride is produced, separating the resulting chromyl chloride from the sulfuric acid, commingling the anhydrous chromyl chloride with a lower monohydric alcohol, whereby reaction occurs to produce a basic chromic chloride, and optionally reacting the basic chromic chloride with a monocarboxylic acid, whereby a water-soluble complex compound of the Werner type in which a trivalent nuclear chromium atom is coordinated with the carboxylic acido group is produced.

U. S. Patents 2,524,803, 2,273,040 and 2,356,161 describe processes for producing a basic chromic chloride and in turn for producing complex chromium compounds of the Werner type.

Iler Patent 2,524,803 teaches a process in which an aqueous solution containing, by weight, from 12 to 35 per cent of chromium trioxide and more than 16 per cent of hydrogen chloride is mixed with a solution of a monohydric aliphatic alcohol containing not more than 4 carbon atoms. Thereafter, the resulting solution can be mixed with a carboxylic acid to produce complex compounds of the Werner type. The compounds so prepared contain water in an amount which causes gelling upon storage and which is in excess of that needed to stabilize the complex compounds. Consequently, the products are subjected to at least partial dehydration, preferably by azeotropic distillation, prior to use.

The processes described in U. S. 2,273,040 and U. S. 2,356,161 effect the reaction between a carboxylic acido group and a basic trivalent chromium salt in a nonaqueous solvent such as carbon tetrachloride. The ultimate products obtained from these processes have to be freed of solvent preparatory for use in aqueous dispersion of solution.

While the processes of the above-mentioned patents are good and give products ultimately having satisfactory quality, it would be advantageous to achieve a more economic process through increased equipment capacity and shorter cycle time and also enhance the stability and shelf life of the product.

Now, according to the present invention, improved processes for producing a basic chromic chloride, and particularly, stable complex compounds of the Werner type in which trivalent nuclear chromium atoms are coordinated with carboxylic acido groups, are provided in which chromium trioxide, hydrogen chloride and sulfuric acid of at least 68 per cent (by weight) strength are mixed to produce anhydrous chromyl chloride, the resulting chromyl chloride is separated from sulfuric acid, and the anhydrous chromyl chloride is reacted with a lower monohydric aliphatic alcohol to produce a basic chromic chloride. Optionally, contact is effected between the basic chromic chloride so produced and a carboxylic acido group, whereby a complex compound of the acido group and the basic chromic chloride is produced.

In the drawing there is a flow sheet illustrating a preferred process of my invention. The discussion of the invention which follows may be more readily understood by reference to the drawing.

According to a process of the invention, I first charge sulfuric acid to a reactor at room temperature. If desired, water may be charged to the reactor prior to introducing a charge of concentrated sulfuric acid. Chromium trioxide is then added to the sulfuric acid solution with agitation. Hydrogen chloride, either anhydrous or aqueous, is added below the surface of the agitated mixture of chromium trioxide and sulfuric acid. The temperature of the reaction mixture is maintained below 55° C. by means of external cooling. Reaction between the chromium trioxide and hydrogen chloride is thereby effected to yield anhydrous chromyl chloride. The chromyl chloride is separated from the sulfuric acid. The majority of the sulfuric acid is recycled for use in the initial step of the processes of my invention.

The anhydrous chromyl chloride, freed of sulfuric acid, is added to a reactor containing a refluxing lower monohydric aliphatic alcohol whereby a basic chromic chloride is produced. A coordinated complex can then be prepared by effecting contact between the alcoholic solution containing the basic chromic chloride and a carboxylic acido group.

In a preferred method for bringing together the chromium trioxide, hydrogen chloride and sulfuric acid to produce anhydrous chromyl chloride, fresh concentrated sulfuric acid (99% strength) is added to the recycle acid heel in a jacketed, glass-lined steel reactor. Then, while agitating the mixture consisting of chromium trioxide and sulfuric acid and cooling the mixture to maintain the temperature of the system below 55° C., anhydrous hydrogen chloride is slowly added below the surface of the agitated and cooled mixture at a rate controlled to help keep the temperature of the reactants below 55° C.

While the above method of mixing the chromium trioxide, hydrogen chloride and sulfuric acid is a preferred one, it will be understood that the sequence of mixing the components is not critical. For instance, sulfuric acid may be added to a slurry of chromium trioxide in aqueous hydrogen chloride to produce anhydrous chromyl chloride. In such a method, however, large amounts of aqueous hydrogen chloride are preferably avoided since additional sulfuric acid will be required to maintain the reaction system in an anhydrous state. Still other methods of bringing the components together, such as, for instance, a concurrent mixing of chromium trioxide, hydrogen chloride and sulfuric acid may be employed.

The proportions in which the chromium trioxide, hydrogen chloride, and sulfuric acid are mixed may be varied, the principal limiting requirement being that sulfuric acid be present in sufficient amount and strength to maintain the system in the anhydrous state despite the water produced as shown in Equation 1.

1. $2CrO_3 + 4HCl \rightarrow 2CrO_2Cl_2 + 2H_2O$

The proportion of hydrogen chloride to chromium trioxide in the reaction mixture is not critical. It will be understood that sufficient hydrogen chloride should be present to react with all of the chromium trioxide. If insufficient hydrogen chloride is present, some chromium trioxide may not react and may dissolve in the chromyl chloride.

The advantages of the processes of the invention are most fully realized when hydrogen chloride and chromium trioxide are used in the proportions of at least 2 but not more than 2.5 moles of hydrogen chloride for each mole of chromium trioxide. It will be understood that in order to assure complete reaction of the chromium trioxide with the hydrogen chloride and to prevent "by-passing" by the hydrogen chloride, the chromium trioxide should be completely suspended in the reaction mixture.

It is preferred to avoid high local concentration of hydrochloric acid and temperatures above 55° C. These conditions decrease the yield of chromyl chloride by an oxidation-reduction reaction shown by Equation 2. Excess hydrogen chloride in contact with chromyl chloride solution should also be avoided as a consequence of the reaction represented by Equation 2.

2. $2CrO_2Cl_2 + 8HCl = 2CrCl_3 + 3Cl_2 + 4H_2O$

For purposes of this invention, a short reaction and holding time is preferred. Yield losses due to Equation 2 are thereby decreased. Reaction times of from 45 minutes to about two hours are particularly preferred.

It will be understood that during the reaction the reactor is preferably kept under a slight vacuum. At the completion of the reaction, an increased pressure can be observed. This indicates that hydrogen chloride is no longer being consumed. The completion of the reaction may also be indicated by an increased gas flow which may be detected by means of a suitable flowmeter in the "off gas" line.

As has been set out above, the hydrogen chloride used in the processes of my invention may be anhydrous or aqueous. Any of a wide variety of aqueous hydrogen chloride solutions may be used. There may be used, for instance, 20° Baumé muriatic acid or 22° Baumé muriatic acid. Other technical grades of strong aqueous hydrogen chloride may be used. Anhydrous hydrogen chloride is preferred.

The sulfuric acid used in the processes of the present invention may be any of the commercially available technical grades of sulfuric acid having at least 68 per cent (by weight) strength. If desired, a more refined sulfuric acid of at least 68 per cent strength can be used. In those instances where aqueous hydrogen chloride and sulfuric acid as dilute as, say, 69 per cent are used, sufficient excess of sulfuric acid should be employed to keep the strength of the resultant diluted sulfuric acid (after the completion of reaction) at or above 68 per cent.

On a virgin charge, 98 per cent sulfuric acid is preferably diluted with water to about 72 per cent strength. The reason for dilution is that when the starting acid is of high strength, say, 98 to 99 per cent, the resulting mixture is of such high viscosity that the gaseous hydrogen chloride passes through the viscous mass with little reaction. When anhydrous hydrogen chloride is used, it is preferred to use sulfuric acid having an initial strength not exceeding 85 per cent. Use of sulfuric acid having an initial strength above 85 per cent, say, 93 per cent, renders the separation of the chromyl chloride more difficult, since the resultant diluted sulfuric acid differs but slightly in density from the chromyl chloride.

As shown in the flowsheet, the sulfuric acid used may be a mixture of fresh 98–99% sulfuric acid and acid recovered in a subsequent step in the process, which will be more fully set out hereinafter. The use of this recovered or recycled sulfuric acid is particularly preferred and various benefits and economies result from its use. The strength of the "recycle" acid following the removal of the chromyl chloride from the reaction system is usually about 70 per cent strength. The 70 per cent acid is preferably fortified with 98 per cent sulfuric acid to bring the strength of the recycle acid to, say, 72 per cent.

The amount of 98 per cent sulfuric acid added to the recycle acid must be such that the resulting quantity of acid is sufficient to remove all of the water of reaction and to maintain the 68 per cent critical minimum acid strength. In the event the acid strength should fall below this critical value, the yields of chromyl chloride are substantially decreased. An explanation of this phenomenon is the increased solubility of chromyl chloride in sulfuric acid of weaker strength than 68 per cent. The dehydration power of the sulfuric acid is also substantially reduced as the strength of the acid drops below 68 per cent.

After the chromium trioxide, hydrogen chloride and sulfuric acid are mixed to form chromyl chloride, the temperature of the system being maintained below 55° C. as above set out, there is obtained a reaction mass composed of an acid phase consisting substantially of sulfuric acid and water and a heavier anhydrous phase containing chromyl chloride. These two phases are separated.

The separation of the phases preparatory to reacting the anhydrous chromyl chloride with a lower alkanol is preferably one utilizing gravity. Thus, according to a preferred embodiment of the invention, the reaction mass is separated into its phases by decantation. The chromyl chloride layer is the heavier.

It will be understood that the waste sulfuric acid, which may contain some dissolved hydrochloric acid, should not be permitted to remain in contact with the chromyl chloride any longer than is necessary since chromyl chloride and hydrogen chloride react to decrease the yield in accordance with Equation 2. Additionally, the recycle contaminated sulfuric acid may react with chromyl chloride according to Equation 3 with a resulting decrease in yield.

3. $10CrO_2Cl_2 + 12H_2SO_4 + 16HCl \rightarrow$
$4Cr_2(SO_4)_2.5H_2O + 2CrCl_3 + 15Cl_2$ Precipitates analyzing, on a dry basis, $93.4\%$ $Cr_2(SO_4)_3$ and $6.6\%$ $CrCl_3$ have been observed to settle out of recycle contaminated acid in periods of about one day.

The temperature and pressure requirements are not critical in the decantation operation. For optimum results, the anhydrous chromyl chloride should upon completion of this step be completely free of sulfuric acid contamination.

The acid phase obtained after separation from the product phase consists of diluted sulfuric acid of about 70 per cent concentration. This sulfuric acid phase is suitable for reuse in the initial reaction. Preferably, the used acid is fortified with stronger sulfuric acid to increase the acid strength to about 72 per cent as previously mentioned. In carrying out such a recycle operation, a substantial proportion of the recovered sulfuric acid is recycled, although not all of the acid is so used. To recycle all the acid continually would effect a constant increase in the amount of acid employed in the initial reaction between hydrochloric acid and chromium trioxide. Accordingly, a portion of the recovered sulfuric acid is withdrawn from the operation following gravity separation.

The anhydrous chromyl chloride prepared according to the processes of my invention is reduced with a lower monohydric aliphatic alcohol to basic chromic chloride. The chromyl chloride is preferably fed into a reactor at a controlled rate under nitrogen pressure and dispersed below the surface of the agitated refluxing alcohol. Prior to bringing the alcohol to reflux the reactor is purged with nitrogen and a nitrogen blanket established. The reaction between the chromyl chloride and an alcohol is highly exothermic. The heat of reaction is removed preferably by cooling water in the reactor jacket and reflux condenser.

To insure immediate dilution with excess alcohol the chromyl chloride should be injected into the alcohol in a fine stream in a zone of very high turbulence. Otherwise, local high temperatures, even amounting to a submerged flame, are reached and insoluble chromic oxide is produced. Very rapid mixing of the chromyl chloride with the excess alcohol is essential and is preferably achieved by injecting the chromyl chloride as a high velocity stream. The chromyl chloride must be injected below the level of the liquid alcohol since mixture with alcohol vapors is likely to result in an explosion.

The monohydric aliphatic alcohol which is used to reduce the chromyl chloride in accordance with the processes of my invention should contain not more than 4 carbon atoms. There may be used for instance, methanol, ethanol, n-propanol, isopropanol, normal, secondary, tertiary or isobutyl alcohol. Of these, I prefer isopropanol.

The amount of lower alcohol required to react with anhydrous chromyl chloride is as shown in Equation 4, wherein the lower alcohol is, for purposes of illustration, isopropanol:

4. $2CrO_2Cl_2 + 3(CH_3)CHOH =$
$2Cr(OH)Cl_2 + 3(CH_3)_2CO + 2H_2O$

As a practical matter, an excess of alcohol is usually employed, since the alcohol acts as a solvent for the reactants and products formed therefrom.

It will be understood that when the stoichiometric proportion of ethanol is used as a reducing agent acetic acid (not acetone as shown in Equation 4) is formed. If an excess of ethanol, say, twice or three times the stoichiometric quantity is used, acetaldehyde is produced. The acetic acid formed coordinates with the chromium of the basic chromic chloride to form acetato chromic chloride. By subsequently adding a longer chain monocarboxylic acid, for instance, stearic acid or substances capable of giving stearato groups, the acetato groups may be replaced with stearato groups on the complex. There often remains a residue of the acetato groups which are undesirable if the complex is to be used for imparting water repellency to hydrophilic substances.

It is particularly preferred for the above reason to use a secondary alcohol such as, for instance, isopropanol. The product of the oxidation of a secondary alcohol is a ketone, for instance, acetone in the case of isopropyl alcohol, which does not coordinate with the chromium. If desired, the acetone may be readily removed from the product by conventional methods.

As already mentioned, a substantial excess of a lower alcohol is used to serve as a solvent for the reactants and the products of the reaction. Another solvent may, of course, be used but this necessitates a solvent removal step and thereby complicates the process.

As previously indicated, the chromyl chloride should be well dispersed when added to the alcohol. This prevents local high concentrations and consequently lessens high temperature degradation. In the event a large quantity of chromyl chloride contacts the lower alcohol the heat evolution may be so rapid and the dissipation so slow that the alcohol ignition temperature is quickly reached and an explosion may occur. During the chromyl chloride addition the lower monohydric alcohol should be kept at reflux temperature to assure rapid reaction with the chromyl chloride. This prevents any build-up of the unreacted chromyl chloride which may later react with increased velocity and eventually cause an explosion.

When a basic chromic chloride produced by a process of the invention is to be converted to the coordination complex with an organic acido group the proportion of chlorine ions united with the trivalent chromium by primary valence bonds must be in the range from about 1.5 to about 3.0, with a corresponding proportion of hydroxyl groups to satisfy the three primary valences of the chromium. Thus, a basic chromic chloride having two chlorine atoms per chromium will contain one hydroxyl per chromium. It is particularly preferred that the proportion of chlorine per chromium be from about 1.85 to 2.5. Especially excellent results have been obtained using two chlorine atoms per chromium.

To convert the basic chromium chloride to a coordination complex with an acido group, there is added to the basic chromic chloride a suitable source of such acido group. The basic chromic chloride is preferably dissolved in an excess of the alcohol which was used for the reduction of chromyl chloride. Of course, another suitable solvent for the basic chromic chloride may be used at this point. The free acid or any acid compound capable of yielding the free acid under the reaction conditions may be used as the source of acido groups.

Thus, one may add stearic acid, for instance, to a basic chromic chloride in isopropanol solution prepared as above described. It is advantageous to effect such addition and the formation of the complex at a somewhat elevated temperature. Decided heat economies can be achieved by adding the stearic acid shortly following the formation of the basic chromic chloride, whereby a portion of the heat of reaction of the oxidation-reduction reaction is recovered. In some instances, it may be necessary to keep the alcohol-basic chromic chloride solution at reflux temperature for a period of at least 15 minutes in order to dissolve the sparingly soluble carboxylic acid. This heating operation is, however, preferably avoided since with some monocarboxylic acids, for instance, stearic acid, heating promotes sludging. Incomplete complexing at this point generally results in a product with poor water repellency characteristics.

The proportion of carboxylic acid to add is governed by the number of acido groups which it is desired to have coordinated with the chromium atom. For practical purposes it has been found that a proportion of acido groups to chromium atoms of about 0.5:1 is as high as it is necessary to go in producing the complex.

The processes of this invention are applicable to the preparation of chromium coordination complex compounds of the Werner type with any monocarboxylic acid. The acid may be aliphatic, as in the case of acetic, or it may be aromatic such as benzoic. It may be a short chain acid such as butyric or a long chain acid such as stearic. It may be saturated as in the case of propionic or unsaturated as in the case of oleic.

Representative of other monocarboxylic acids which may be used are lauric, palmitic, capric, undecoic, tridecoic, myristic, penadecanoic, margaric, nondecoic, arachidic, undecydenic, myristelenic, palmitolenic, linoleic, linolenic and elaeostearic, abietic, naphthenic, naphthoic and similar monocarboxylic acids. A compound of the acid, such as an ester or salt, which can liberate the free acid under the conditions of the coordination reaction is, of course, equivalent to the free acid.

The nature of the Werner type complex chromium compounds and the nomenclature applied to them is described fully in the above-mentioned U. S. Patents 2,273,040 and 2,356,161. By deleting the suffix "-ic" from the name of the carboxylic acid and adding the suffix "-ato" a system of naming the acido groups coordinated with the chromium and hence for naming the chromium complexes is provided. Thus, stearic acid gives stearato groups and the complex is called stearato chromic chloride.

The properties of the complexes formed vary with the character of the coordinated acido group. The long chain acido groups, such as stearato groups, make the complexes extremely useful for providing a high degree of water repellency to hydrophilic substances. On the other hand, the short chain groups may have special characteristics imparting special usefulness. For instance, unsaturated chains in coordinated acido groups, such as occur in beta furyl acrylic acido groups, retain their ability to interpolymerize with ethylenic-type polymers and hence to form a chemical bond between the chromium and the polymer.

It is often desirable to stabilize a chromium coordination complex compound of the Werner type produced by the processes of my invention, say, for instance, stearato chromic chloride, by adding water in an amount which is less than 7 per cent by weight of the marketed product. Stearato chromic chloride having a high water content, that is above 15%, gels on standing. With stearato chromic chloride compositions having a water content of from about 7 to 15 per cent, sludging occurs.

For satisfactory shelf life an acido chromic chloride may have a water concentration as low as 3 per cent by weight or even lower. However, even at the low value of 3 per cent small crystals may deposit upon long storage. Optimum product quality is obtained with stearato chromic chloride having a water concentration within the range of about 5 to about 6 per cent by weight.

For ease of operation, the adjustment of the water concentration is generally made just prior to basic chromic chloride-carboxylic acid reaction step. This is in conformity with the flowsheet shown in the drawing. The exact amount of water to be added within the specified limits can best be determined by a few simple tests under the specific conditions of the process selected and with the specific carboxylic acid employed. It will be understood that after a few simple tests have been run, calculations can be made whereby the amount of water can be computed based upon weight of the chromyl chloride.

The invention may be more fully understood by reference to the following example:

*Example*

A slurry of chromium trioxide in sulfuric acid was made up by adding 280 parts of technical chromium trioxide (99.5%) to an agitated mixture consisting of 122 parts of 99% (by weight) technical sulfuric acid and 1720 parts of recycled sulfuric acid contained in a water-jacketed reactor. Cooling water was circulated through the jacket to maintain the temperature of the $CrO_3$—$H_2SO_4$ mixture within the temperature range of from about 35° to 55° C. There was then added to the mixture, below its surface, 216 parts of anhydrous hydrogen chloride. The temperature of the reaction mixture was kept below 55° C. by external cooling throughout the 45-minute period required for completion of the exothermic reaction. Chlorine gas produced as a by-product was vented.

The reaction mass at this point consisted of two phases. A heavier layer contained the anhydrous chromyl chloride. The lighter phase was composed of sulfuric acid of 70 per cent strength and was contaminated with chromium and chlorine-containing compounds. The two phases were separated by decantation. 412 parts of chromyl chloride was obtained. The chromyl chloride is a limpid blood-red (when viewed by transmitted light) liquid and has the following physical properties:

Specific gravity _____ 1.9034 (25° C.)
Viscosity _____ 0.726 centipoises (25° C.)
Freezing point _____ −96.5° C.
Boiling point _____ 117.6° C.

About 90 per cent (1720 parts) of the total amount of used sulfuric acid was recycled and fortified with 99% sulfuric acid for use in the initial step of the process.

412 parts of anhydrous chromyl chloride prepared as above described was slowly added below the surface of a refluxing liquid consisting of 1370 parts of isopropanol. Prior to bringing the isopropanol to reflux, the reactor containing the alcohol was purged with nitrogen and a blanketing nitrogen flow initiated. The reduction of the chromyl chloride to basic chromic chloride, $Cr(OH)Cl_2$, by the isopropanol was completed in a period of about one hour.

In order to prevent crystal formation, and thus minimize the sludge deposition upon prolonged storage, 69 parts of water was added to the isopropanol solution containing the basic chromic chloride. The blanketing nitrogen flow was stopped and the mixture cooled to 50° C. 381 parts of stearic acid was then added and the resulting mixture heated for a period of 70 minutes at a temperature of about 40° C. for complexing.

An additional 168 parts of isopropanol was then added. The resulting clear green solution of stearato chromic chloride in aqueous isopropanol was stable upon standing and imparted remarkable water repellency to paper treated with it.

I claim:

1. In a process for producing a basic chromic chloride, the step which comprises injecting anhydrous chromyl chloride in a fine stream into a monohydric aliphatic alcohol containing not more than 4 carbon atoms, the alcohol being in a turbulent state and the chromyl chloride being injected below the liquid level of said alcohol.

2. In a process for producing a basic chromic chloride, the step which comprises injecting anhydrous chromyl chloride in a fine stream into a monohydric aliphatic alcohol containing not more than 4 carbon atoms, said alcohol being maintained at its boiling point and in a turbulent state and said chromyl chloride being injected below the liquid level of the boiling alcohol, whereby rapid reaction is effected between the anhydrous chromyl chloride and the alcohol.

3. In a process for producing a basic chromic chloride, the step which comprises injecting anhydrous chromyl chloride in a fine stream into boiling isopropanol in the absence of an inert diluent, said isopropanol being present in a stoichiometric excess and in a turbulent state, and said anhydrous chromyl chloride being injected below the liquid level of the isopropanol.

4. In a process for producing a lower monohydric aliphatic alcohol solution of a water-soluble complex compound of the Werner type in which a trivalent nuclear chromium atom is coordinated with a carboxylic acido group, the steps comprising rapid mixing of anhydrous chromyl chloride with a monohydric aliphatic alcohol containing not more than 4 carbon atoms in the absence of an inert diluent to produce a basic chromic chloride, and reacting the basic chromic chloride in an aqueous solution of said alcohol with a monocarboxylic acid to produce an alcohol solution of carboxylato chromic chloride having a water content of no greater than 7% by weight of said solution.

5. In a process for producing an isopropanol solution of a water-soluble complex compound of the Werner type in which a trivalent nuclear chromium atom is coordinated with a stearato group, the steps comprising rapid mixing of anhydrous chromyl chloride with isopropanol in the absence of an inert diluent to produce a basic chromic chloride, and reacting the basic chromic chloride in aqueous isopropanol with stearic acid to produce an isopropanol solution of stearato chromic chloride having a water content of no greater than 7% by weight of said solution.

6. In a process for producing an isopropanol solution of stearato chromic chloride stabilized against gelation and sludging, the steps comprising injecting anhydrous chromyl chloride into a stoichiometric excess of boiling isopropanol in the absence of an inert diluent to produce a basic chromic chloride, said anhydrous chromyl chloride being injected below the liquid level of the isopropanol, and effecting contact between stearic acid and the basic chromic chloride in the presence of aqueous isopropanol to produce an isopropanol solution of stearato chromic chloride having a water content of from 3 to 6% by weight of said solution.

References Cited in the file of this patent

UNITED STATES PATENTS

| Number    | Name | Date          |
|-----------|------|---------------|
| 2,273,040 | Iler | Feb. 17, 1942 |
| 2,356,161 | Iler | Aug. 22, 1944 |

OTHER REFERENCES

Mellor Comprehensive Treatise on Inorganic and Theoretical Chemistry, volume 11, page 392 (1931).

Fernelius Inorganic Synthesis, volume 2, page 205–207.